United States Patent Office 3,745,206
Patented July 10, 1973

3,745,206
REMOVAL AND RECOVERY OF SOLUBLE
PLATINUM CATALYSTS
Loren A. Haluska and John W. Ryan, Midland, Mich.,
assignors to Dow Corning Corporation, Midland, Mich.
No Drawing. Filed Oct. 1, 1970, Ser. No. 77,397
Int. Cl. C01g 55/00
U.S. Cl. 423—22                                  8 Claims

ABSTRACT OF THE DISCLOSURE

Processes are disclosed for the removal and recovery of soluble platinum catalysts from liquids. The processes comprise the steps of (1) adding a solid carrier having a thiol or thioether functional silicone attached to its surface to the liquid from which the soluble platinum catalyst is to be removed, (2) heating the resulting mixtures with agitation, (3) separating the solid carrier and formerly soluble platinum catalyst from the liquid, and (4) recovering the soluble platinum catalyst from the solid carrier.

---

Platinum and platinum products, such as platinum catalysts, are expensive materials. Nevertheless, such materials are frequently employed by industry. For example, platinum catalysis is used in the hydrogenation of unsaturated fats and oils, in the platformating of gasoline and in the addition of compounds containing carbon-to-carbon unsaturation (C=C) to ≡SiH containing compounds. The desirability of recovering such materials, especially with a view towards reutilization, for economic reasons is obvious. Moreover, with the limited amount of platinum produced annually, and considering the fact that most of the significant sources of platinum lie outside the United States, it is now desirable and conceivably someday could become necessary to remove and recover platinum from products and industrial processes if one wishes to have any for future use. This is particularly true where platinum is employed for the catalysis of chemical processes. Furthermore, it has been found that unless the platinum catalyst is removed from some products it is used to produce, it detracts from the use of that product. For the foregoing reasons, it is an object of this invention to provide a process for the removal of soluble platinum catalysts from liquids. It is also an object of this invention to provide a process for the recovery of soluble platinum catalysts from liquids. Other objects of this invention will be apparent from the following detailed description thereof.

This invention relates to a process for the removal of a soluble platinum catalyst from a liquid, said process comprising the steps of (1) adding a solid carrier having a thiol or thioether functional silicone attached to its surface to the liquid from which the soluble platinum catalyst is to be removed, (2) heating the resulting mixture with agitation, and (3) separating the solid carrier and formerly soluble platinum catalyst from the liquid.

This invention also relates to a process for recovering a soluble platinum catalyst from a liquid, said process comprising the steps of (1) adding a solid carrier having a thiol or thioether functional silicone attached to its surface to the liquid from which the soluble platinum catalyst is to be recovered, (2) heating the resulting mixture with agitation, (3) separating the solid carrier and formerly soluble platinum catalyst from the liquid, and (4) recovering the soluble platinum catalyst from the solid carrier.

The solid carrier employed in step (1) of the above defined processes can be any solid carrier having a thiol or thioether functional silicone attached to its surface and which is insoluble in the liquid from which the soluble platinum catalyst is to be removed or recovered. By the term "soluble platinum catalyst" it is meant any platinum catalyst which is soluble in the liquid from which it is to be removed or recovered. By way of illustration, the solid carrier can be a clay, silica, ceramic, diatomaceous earth, glass fiber, alumina, aluminum silicate or titania.

The solid carrier employed herein must have a thiol or thioether functional silicone attached to its surface. By the term "attached" it is meant that the silicone is held to the solid carried by a physical and/or chemical bond and thus is not subject to separation during use in the processes of this invention. So far as is known at this time any thiol or thioether group which is pendent from or bonded to a silicon atom which is attached to the solid carrier can be employed herein. Specific examples of suitable thiol and thioether functional silicones which can be employed herein include $HSCH_2CH_2Si\equiv$, $HS(CH_2)_3Si\equiv$, $HS(CH_2)_4Si\equiv$, $HS(CH_2)_6Si\equiv$,
$HS(CH_2)_{18}Si\equiv$, $HSCH_2CH(CH_3)CH_2Si\equiv$,
$HSC_6H_4CH_2CH_2Si\equiv$, $(HSCH_2)_2CHCH_2CH_2Si\equiv$,
$(HSCH_2CH_2)_3CCH_2CH_2Si\equiv$,
$\qquad (HSCH_2)_2(C_2H_5)CCH_2SCH_2CH_2Si\equiv$,
$(HSCH_2COOCH_2)_2(C_2H_5)CCH_2OOCCH_2SCH_2CH_2Si\equiv$,
$CH_3S(CH_2)_3Si\equiv$, $CH_2=CHS(CH_2)_3Si\equiv$,
$C_2H_5OOCCH_2CH_2SCH_2CH(CH_3)CH_2Si\equiv$
$NCCH_2CH_2S(CH_2)_3Si\equiv$, $H_2NCH_2CH_2S(CH_2)_3Si\equiv$,
$H_2NSCNH(CH_2)_3Si\equiv$, $HSC_6H_4Si\equiv$, and $HSC_6H_{10}Si\equiv$.

The unsatisfied valences of the silicon atoms in the above illustrations can be any of the well known substituents or linking groups and do not constitute the essence of this invention and have not been shown in order that those skilled in the art can more readily see wherein the essence of the invention lies. By way of illustration these unsatisfied valences can be satisfied by hydrocarbon or substituted hydrocarbon radicals, siloxane linkages and the like. It is preferred that at least one of these valences be satisfied by a siloxane linkage. It is believed that in many instances the thiol and thioether functional silicone groups are attached to the carrier by a silicon-to-oxygen-to-carrier bond ($HSCH_2CH_2CH_2Si$—O—Carrier). However, the present invention is not limited to any such theory of attachment. The solid carrier having a thiol or thioether functional silicone attached to its surface can be prepared by several methods. The best method known to applicants at this time is to take a solid carrier, such as clay or silica, which has hydroxyl groups on its surface and adding it to a solution of a thiol or thioether functional trialkoxysilane in an aqueous or nonaqueous solvent, and then heating the mixture for a short time. It is believed that in this process the alkoxy groups of the silane react with the hydroxyl groups of the carrier thereby attaching or forming a bond between the thiol or thioether functional silicone and the carrier. This reaction can be illustrated by the idealized equation

wherein X is a thiol or thioether functional group and R is an alkyl radical of 1 to 6 (preferably 1 to 3) carbon atoms.

Alternatively, the solid carrier having thiol or thioether functional silicone groups attached to its surface can be prepared by substituting a siloxane, for example, of the general formula $XR'_2Si(OSiR'_2)_yOSi(OR)_3$ or

for the silane in the process of the preceding paragraph. In the formulae X and R are as defined above, R' is a hydrocarbon or substituted hydrocarbon radical and *y* is an integer. Other methods of preparation will be obvious to those skilled in the art from the foregoing disclosure.

The amount of the silicone on the carrier is not critical in terms of operability but is important as for practicality. Generally speaking, the amount of silicone on the carrier will be less than 10% by weight with an amount in the range of 0.25 to 5% being preferred.

The amount of the silicone containing carrier which is added to the liquid from which the platinum is to be removed will depend on the amount of platinum in the liquid that it is desired to remove and on the amount of silicone on the carrier. Thus, while it is not possible to set for any meaningful limitation on the amount of silicone containing catalyst to be added to the liquid it is readily apparent that the amount to be added is easily calculated for any given situation. When one wishes to remove substantially all of the platinum from a given liquid it is believed at this time that best results are obtained by adding a 4 to 5 fold excess of the silicone containing carrier over the theoretical stoichiometric amount required. The silicone containing carrier can be added to the liquid by any means and can be added hot or cold with the former being preferred as the mixture must be heated in the next essential step of the process. It should be noted that the silicone containing carrier can be added to the neat liquid or it can be added to the liquid which has had solvent added thereto to facilitate processing.

The heating of the mixture can range anywhere from a simple warming upwards within the liimts of the thermal stabilities of the materials involved. Normally, heating will be within the range of 50° C. to 200° C. with best results being obtained at temperatures in excess of 80° C. So far as is known, at this time, the source of heat is immaterial. It has been found for many applications that the preferred method is to heat the mixture at reflux temperature. The time of heating will depend on the temperature employed and the completeness of removal desired. Thus the time can range anywhere from a few, say about 5 minutes to several days, say about 7, or longer. Generally speaking, however, when heating at reflux a time of about 3 hours is adequate to insure substantially complete removal. Agitation during the heating, as in most reactions, is necessary to insure adequate contact of the reactants and thereby to reduce the time involved.

After the heating step is complete, the carrier which now contains the formerly soluble platinum catalyst is separated from liquid. Separation can be accomplished by any of the conventional means of separating solids from liquids. For example, separation can be done by allowing settling of the solid and then decanting, or centrifuging to cause settling of the solid and then decanting. It is believed, however, that filtration is the best method of separation, especially when the carrier is a finely divided material.

While the three foregoing steps described are all that are required when it is merely desired to remove a soluble platinum catalyst from a liquid to improve its appearance and/or usability, in many instances it will also be desirable to recover the platinum catalyst for economic reasons or because of necessity. The best method for the recovery of the platinum from the carrier is believed to be by treating the carrier with aqua regia to dissolve the platinum and then evaporating the solution several times employing additional hydrochloric acid with each evaporation to expel nitrosyl compounds which are initially formed. This not only will result in the recovery of the platinum from the carrier but also yield it in the form of chloroplatinic acid ($H_2PtCl_6 \cdot 6H_2O$) which is a commercially used platinum catalyst. Other methods of recovery of the platinum from the carrier will be obvious to those skilled in the art in light of the above disclosure.

Now in order that those skilled in the art may better understand how the present invention can be practiced, the following examples are given by way of illustration and not by way of limitation. All percents referred to herein are by weight unless otherwise specified.

EXAMPLE 1

A silicone-glycol copolymer of the general formula

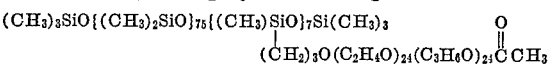

was prepared by reacting appropriate amounts of the siloxane $(CH_3)_3SiO\{(CH_3)_2SiO\}_{75}\{(CH_3)HSiO\}_7Si(CH_3)_3$ and the glycol

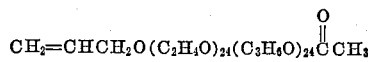

in the presence of chloroplatinic acid. This process and its details are well known and are set forth in U.S. Pat. 3,402,192, the disclosure of which is incorporated herein by reference.

To a flask there was added 454 g. of the above prepared siloxane-glycol copolymer which analysis showed to contain 8 parts per million (p.p.m.) of platinum. To this was added 5 g. of clay (Hydragloss) having a particle size of about 0.06 microns which had been treated by contacting it with 2% of $HS(CH_2)_3Si(OCH_3)_3$. This mixture was heated with agitation for 3 hours at about 110° C. and then filtered to remove the clay. Analysis of the siloxane-glycol copolymer showed that the platinum level was less than 1 p.p.m. This treatment achieved substantially complete removal of the platinum catalyst from the siloxane-glycol copolymer.

EXAMPLE 2

The procedure of Example 1 was repeated except that the clay (Hydragloss 90) had a particle size of about 0.3 micron. Again analysis showed that the platinum level was reduced from about 8 p.p.m. to less than 1 p.p.m.

EXAMPLE 3

The procedure of Example 1 was repeated except that 2.5 g. of the clay was employed. The analysis showed that the platinum level was reduced from about 8 p.p.m. to less than 1 p.p.m.

EXAMPLE 4

To a flask there was added 454 g. of the siloxane-glycol copolymer of Example 1, 75.7 g. of isopropanol and 75.7 g. of toluene. To this was added 5 g. of clay having a particle size of about 5 microns which had been treated by contacting it with 10% of $HS(CH_2)_3Si(OCH_3)_3$. This mixture was heated with agitation for 3 hours at about 89° C. (reflux) and then filtered to remove the clay. Analysis showed that the platinum level was reduced from about 8 p.p.m. to less than 1 p.p.m.

EXAMPLE 5

To a flask there was added 300 g. of a siloxane-glycol copolymer prepared as in Example 1 and 100 g. of isopropanol. To this was added 4 g. of clay (NuCap 300) which had been treated by contacting it with 1% of $HS(CH_2)_3Si(OCH_3)_3$. This mixture was heated with agitation for 1½ hours at 70° C. to 80° C. and then filtered to remove the clay. Analysis showed that the platinum level was reduced from about 21.8 p.p.m. to less than 1 p.p.m.

EXAMPLE 6

The procedure of Example 5 was repeated except that 2 g. of the clay was employed. Again analysis showed the platinum level was reduced to less than 1 p.p.m.

EXAMPLE 7

The procedure of Example 5 was repeated except that 1 g. of the clay was employed. This time analysis showed the platinum level had been reduced to 1 p.p.m.

EXAMPLE 8

To a flask there was added 277 g. of a siloxane copolymer prepared as in Example 1, 46.3 g. of isopropanol and 46.3 g. of toluene. To this was added 10 g. of diatomaceous earth (Super-Cell) which had been treated by contacting it with 1% of $HS(CH_2)_3Si(OCH_3)_3$. This mixture was heated with agitation for 1½ hours at 85–90° C. and then filtered to remove the clay. Analysis showed that the platinum level in the siloxane-glycol copolymer had been reduced from about 35.5 p.p.m. to about 5 p.p.m.

EXAMPLE 9

The procedure of Example 8 was repeated except that the mixture was heated for only 1 hour. The platinum level was shown by analysis to have been reduced to about 7 p.p.m.

EXAMPLE 10

The procedure of Example 8 was repeated except that 4 g. of diatomaceous earth which had been treated by contacting it with 2.5% of $HS(CH_2)_3Si(OCH_3)_3$ was employed, and the mixture was heated for only 1 hour. This time analysis showed the platinum level was reduced to about 14 p.p.m.

EXAMPLE 11

The procedure of Example 8 was repeated except that 2 g. of diatomaceous earth which had been treated by contacting it with 5% of $HS(CH_2)_3Si(OCH_3)_3$ was employed, and the mixture was heated for only 1 hour. This time analysis showed the platinum level had been reduced to about 8 p.p.m.

EXAMPLE 12

When the thiol and thioether functional silanes and siloxanes set forth below are substituted for the mercaptopropyltrimethoxysilanes of Example 1 in equivalent amounts, similar results are obtained.

(1) $HSCH_2CH_2Si(OC_2H_5)_3$
(2) $HS(CH_2)_{18}Si(OC_3H_7)_3$
(3) $HSC_6H_4CH_2CH_2Si(OCH_3)_3$
(4) $CH_2(OH)CH(OH)CH_2SCH_2CH_2Si(OCH_3)_3$
(5) $(HSCH_2COOCH_2)_2(CH_3CH_2)CCH_2OOCCH_2SCH_2CH_2Si(OCH_3)_3$
(6) $(HOCH_2)_2(CH_3CH_2)CCH_2O(CH_2)_3SCH_2CH_2Si(OCH_3)_3$
(7) $(HSCH_2)_3CCH_2SCH_2CH_2Si(OCH_3)_3$
(8) $(HSCH_2CH_2)(CH_3)_2Si\{OSi(CH_3)_2\}_{10}OSi(OCH_3)_3$
(9) $(HSCH_2CH_2)(CH_3)_2Si\{OSi(CH_3)_2\}_{50}\{OSi(CH_3)(C_6H_5)\}_5OSi(OCH_3)_3$
(10) $(CH_3O)_3Si\{OSi(CH_3)_2\}_{100}\{OSi(CH_3)(CH_2CH_2CH_2SH)\}_{100}OSi(OCH_3)_3$
(11) $(CH_3O)_3Si\{OSi(CH_3)(CH_2CH_2CH_2SH)\}_{25}OSi(OCH_3)_3$
(12) $(HSCH_2CH_2CH_2)(CH_3)_2Si\{OSi(CH_3)_2\}_{10}\{OSi(CH_3)(CH_2CH_2CF_3)\}_{10}-OSi(OCH_3)_3$
(13) $HSC_6H_4Si(OCH_3)_3$

EXAMPLE 13

When the clay containing the platinum which is recovered by filtration in Example 1 is treated with aqua regia, the platinum is dissolved in the aqua regia. When this solution of platinum in aqua regia is evaporated several times with the residue being taken up in hydrochloric acid between evaporations, the platinum is recovered in the form of chloroplatinic acid which is a commercially used platinum catalyst.

EXAMPLE 14

When alumina, titania or glass fibers are substituted for the clay of Example 1, similar results are obtained.

That which is claimed is:

1. A process for the removal of a soluble platinum catalyst from a liquid, said process comprising the steps of
(1) adding a solid carrier having a thiol or thioether functional silicone attached to its surface to the liquid from which the soluble platinum catalyst is to be removed,
(2) heating the resulting mixture with agitation, and
(3) separating the solid carrier and formerly soluble platinum catalyst from the liquid.

2. The process as defined in claim 1 wherein the solid carrier is a clay, silica, ceramic, diatomaceous earth, glass fiber, alumina, aluminum silicate or titania; the thiol or thioether functional silicone attached to the surface of the solid carrier has units selected from the group consisting of $HSCH_2CH_2Si\equiv$, $HS(CH_2)_3Si\equiv$, $HS(CH_2)_4Si\equiv$, $HS(CH_2)_6Si\equiv$ $HS(CH_2)_{18}Si\equiv$, $HSCH_2CH(CH_3)CH_2Si\equiv$, $HSC_6H_4CH_2CH_2Si\equiv$ $(HSCH_2)_2CHCH_2CH_2Si\equiv$, $(HSCH_2CH_2)_3CCH_2CH_2Si\equiv$, $(HSCH_2)_2(C_2H_5)CCH_2SCH_2CH_2Si\equiv$, $(HSCH_2COOCH_2)_2(C_2H_5)CCH_2OOCH_2SCH_2CH_2Si\equiv$ $CH_3S(CH_2)_3Si\equiv$, $CH_2=CHS(CH_2)_3Si\equiv$, $C_2H_5OOCCH_2CH_2SCH_2CH(CH_3)CN_2Si\equiv$ $NCCH_2CH_2S(CH_2)_3Si\equiv$, $H_2NCH_2CH_2S(CH_2)_3Si\equiv$, $H_2NSCNH(CH_2)_3Si\equiv$ $HSC_6H_4Si\equiv$, $HSC_6H_{10}Si\equiv$, $CH_2(OH)CH(OH)CH_2SCH_2CH_2Si\equiv$ $(HOCH_2)_2(CH_3CH_2)CCH_2O(CH_2)_3SCH_2CH_2Si\equiv$ and $(HSCH_2)_3CCH_2SCH_2CH_2Si\equiv$; the amount of silicone on the carrier being less than 10% by weight; and the heating is within the range of 50° to 200° C.

3. The process as defined in claim 2 wherein the solid carrier is clay, the silicone attached to the surface of the carrier has the unit $HS(CH_2)_3Si\equiv$, the amount of silicone on the carrier is in the range of 0.25% to 5% by weight, and the solid carrier containing the formerly soluble platinum catalyst is separated by filtration.

4. The process as defined in claim 2 wherein the solid carrier is diatomaceous earth, the silicone attached to the surface of the carrier has the unit $HS(CH_2)_3Si\equiv$, the amount of silicone on the carrier is in the range of 0.25% to 5% by weight, and the solid carrier containing the formerly soluble platinum catalyst is separated by filtration.

5. A process for recovering a soluble platinum catalyst from a liquid, said process comprising the steps of
(1) adding a solid carrier having a thiol or thioether functional silicone attached to its surface to the liquid from which the soluble platinum catalyst is to be recovered,
(2) heating the resulting mixture with agitation,
(3) separating the solid carrier and formerly soluble platinum catalyst from the liquid, and
(4) recovering the soluble platinum catalyst from the solid carrier.

6. The process as defined in claim 5 wherein the solid carrier is a clay, silica, ceramic, diatomaceous earth, glass fiber, alumina, aluminum silicate or titania; the thiol or thioether functional silicone attached to the surface of the solid carrier has units selected from the group consisting of $HSCH_2CH_2Si\equiv$, $HS(CH_2)_3Si\equiv$, $HS(CH_2)_4Si\equiv$, $HS(CH_2)_6Si\equiv$, $HS(CH_2)_{18}Si\equiv$, $HSCH_2CH(CH_3)CH_2Si\equiv$ $HSC_6H_4CH_2CH_2Si\equiv$, $(HSCH_2)_2CHCH_2CH_2Si\equiv$, $(HSCH_2CH_2)_3CCH_2CH_2Si\equiv$ $(HSCH_2)_2(C_2H_5)CCH_2SCH_2CH_2Si\equiv$, $(HSCH_2COOCH_2)_2(C_2H_5)CCH_2OOCCH_2SCH_2CH_2Si\equiv$ $CH_3S(CH_2)_3Si\equiv$, $CH_2=CHS(CH_2)_3Si\equiv$, $C_2H_5OOCCH_2CH_2SCH_2CH(CH_3)CN_2Si\equiv$ $NCCH_2CH_2S(CH_2)_3Si\equiv$, $H_2NCH_2CH_2S(CH_2)_3Si\equiv$, $H_2NSCNH(CH_2)_3Si\equiv$ $HSC_6H_4Si\equiv$, $HSC_6H_{10}Si\equiv$, $CH_2(OH)CH(OH)CH_2SCH_2CH_2Si\equiv$ $(HOCH_2)_2(CH_3CH_2)CCH_2O(CH_2)_3SCH_2CH_2Si\equiv$ and $(HSCH_2)_3CCH_2SCH_2CH_2Si\equiv$; the amount of silicone on the carrier being less than 10% by weight; and the heating is within the range of 50° to 200° C.

7. The process as defined in claim 6 wherein the solid carrier is clay, the silicon attached to the surface of the carrier has the unit $HS(CH_2)_3Si\equiv$, the amount of silicone on the carrier is in the range of 0.25% to 5% by weight, and the solid carrier containing the formerly soluble platinum catalyst is separated by filtration.

8. The process as defined in claim 6 wherein the solid carrier is diatomaceous earth, the silicone attached to the surface of the carrier has the unit $HS(CH_2)_3Si\equiv$, the amount of silicone on the carrier is in the range of 0.25% to 5% by weight, and the solid carrier containing the formerly soluble platinum catalyst is separated by filtration.

References Cited

UNITED STATES PATENTS

| | | |
|---|---|---|
| 3,227,675 | 1/1966 | Papalos. |
| 3,303,020 | 2/1967 | Clement et al. _____ 252—411 R |
| 3,396,123 | 8/1968 | Urban _____ 252—428 |
| 3,469,971 | 9/1969 | Leopaul _____ 23—139 X |

HERBERT T. CARTER, Primary Examiner

U.S. Cl. X.R.

252—411 R; 75—121

U.S. PATENT OFFICE
UNITED STATES PATENT OFFICE
CERTIFICATE OF CORRECTION

Patent No. 3,745,206　　　　　　　　　　Dated: July 10, 1973

Loren A. Haluska and John W. Ryan

It is certified that errors appear in the above-identified patent and that said Letters Patent are hereby corrected as shown below:

Column 6, line 20, the formula

" $(HSCH_2COOCH_2)_2(C_2H_5)CCH_2OOCH_2SCH_2CH_2Si\equiv$ "　should read

-- $(HSCH_2COOCH_2)_2(C_2H_5)CCH_2OOCCH_2SCH_2CH_2Si\equiv$ --.

Column 7, line 11, "silicon" should read --silicone--.

Signed and sealed this 12th day of March 1974.

(SEAL)
Attest

EDWARD M. FLETCHER, JR.　　　　　　C. MARSHALL DANN
Attesting Officer　　　　　　　　　Commissioner of Patents